H. B. NICHOLS.
RAILWAY SWITCH.
APPLICATION FILED SEPT. 12, 1906. RENEWED DEC. 18, 1907.

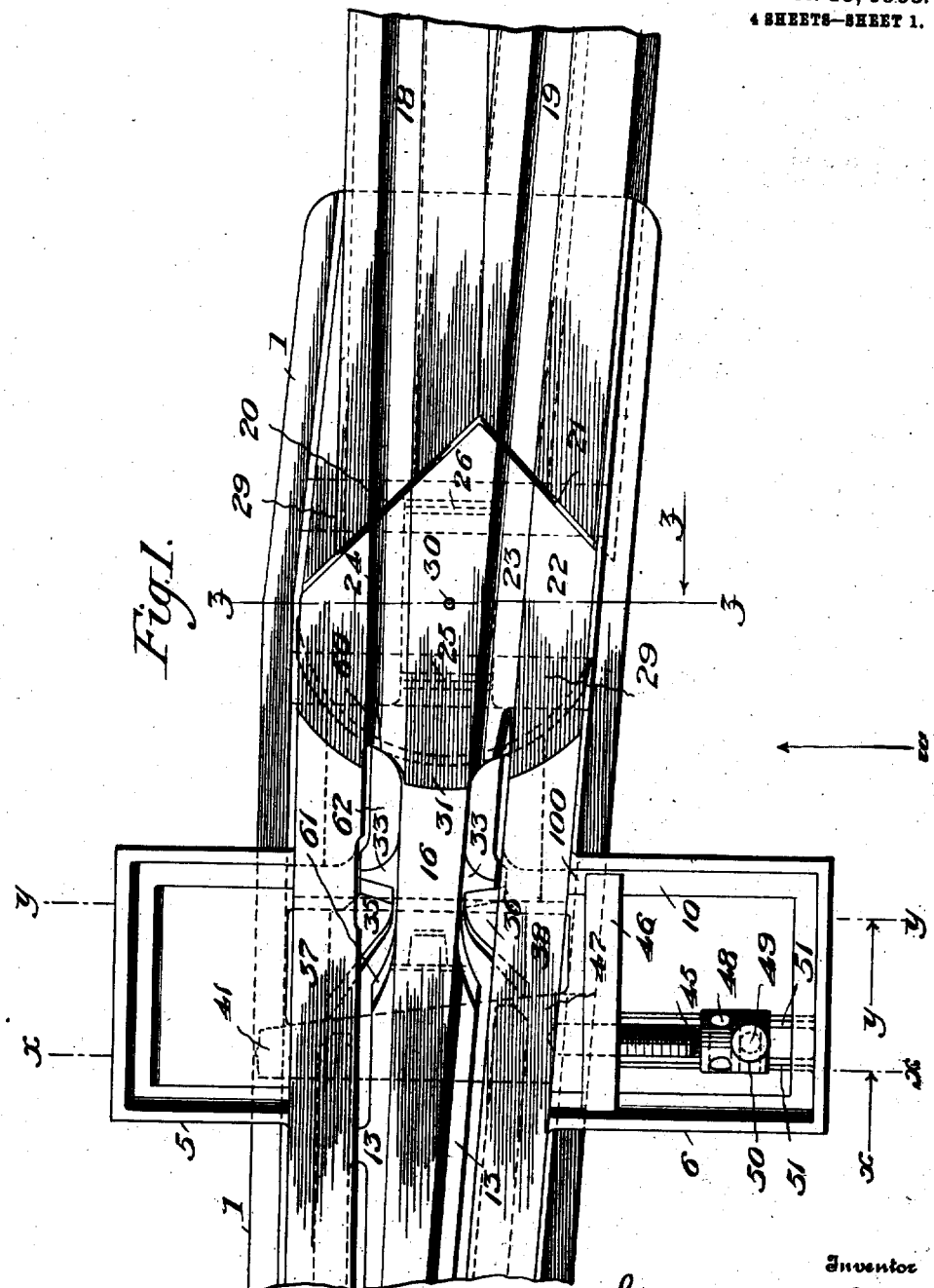

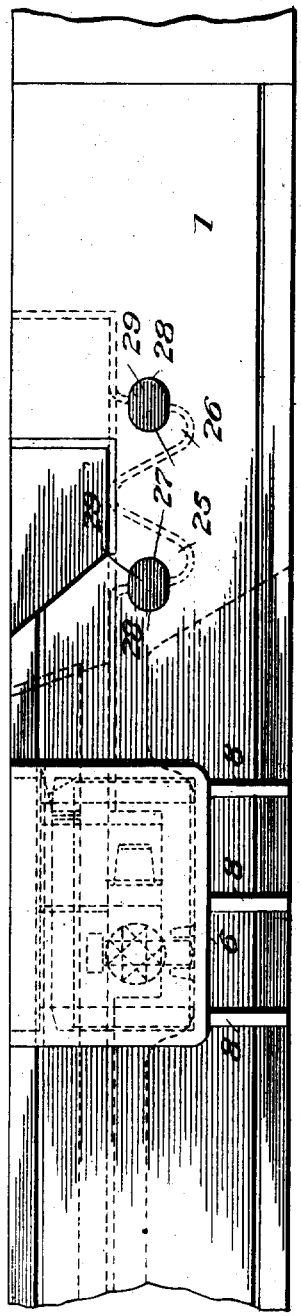
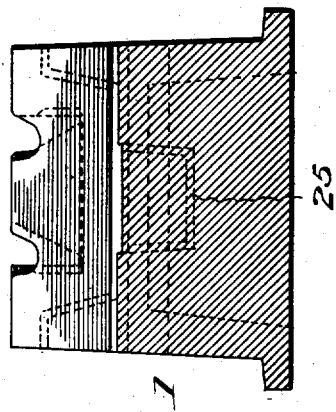

901,254.

Patented Oct. 13, 1908.
4 SHEETS—SHEET 3.

Witnesses
Wm. C. Dashiell
James H. Marr

Inventor
Henry B. Nichols
By Edward E. Clement
Attorney

THE NORRIS PETERS CO., WASHINGTON, D. C.

H. B. NICHOLS.
RAILWAY SWITCH.
APPLICATION FILED SEPT. 12, 1906. RENEWED DEC. 18, 1907.

901,254.

Patented Oct. 13, 1908.
4 SHEETS—SHEET 4.

Witnesses
Wm. C. Dashiell
James H. Marr

Inventor
Henry B. Nichols
By Edward E. Clement
Attorney

THE NORRIS PETERS CO., WASHINGTON, D.C.

UNITED STATES PATENT OFFICE.

HENRY B. NICHOLS, OF PHILADELPHIA, PENNSYLVANIA.

RAILWAY-SWITCH.

No. 901,254.

Specification of Letters Patent.

Patented Oct. 13, 1908.

Application filed September 12, 1906, Serial No. 384,335. Renewed December 18, 1907. Serial No. 407,044.

*To all whom it may concern:*

Be it known that I, HENRY B. NICHOLS, a citizen of the United States, residing at Philadelphia, in the county of Philadelphia and State of Pennsylvania, have invented certain new and useful Improvements in Railway-Switches, of which the following is a specification, reference being had thereto the accompanying drawing.

My invention relates to railway switches, and has for its object the provision of a switch of this character which shall be simple in its construction, without any pivot pin for the switch tongue, and at the same time economical to manufacture and free from excessive wear or deterioration under heavy service conditions.

Briefly stated, my invention comprises a railway switch consisting of a body portion of any suitable construction, a pinless tongue seated on the body portion and having a centering bearing at its extreme rear end, and rigid means forward of said bearing and intermediate the ends of the tongue, for holding the tongue back against such bearing. The holding means may also be conveniently arranged to hold the tongue down to its bed or seat, and the construction of the centering bearing is also preferably such as to assist in this action.

The invention also includes means for adjustment for the purpose of compensating for wear, and means for excluding dirt or other foreign matter from the tongue bearing.

The body portion of the structure may be of any well known type, either with or without a surface plate, the form of the tongue and of the holding down devices therefor may be changed, and various means for adjusting the holding down members may be used within the scope of my invention.

My invention is illustrated in the accompanying drawings in which—

Figure 3:
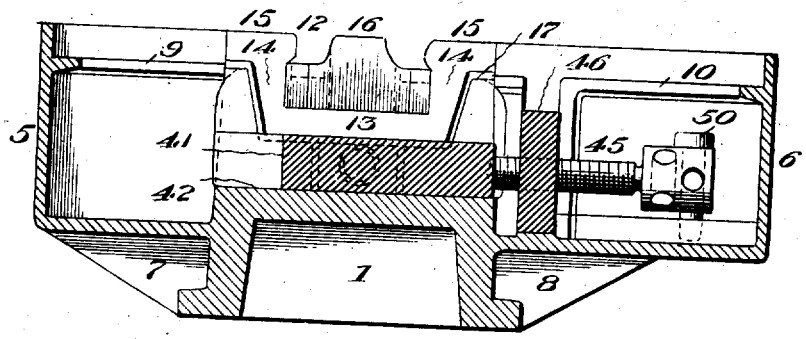
Figure 4:
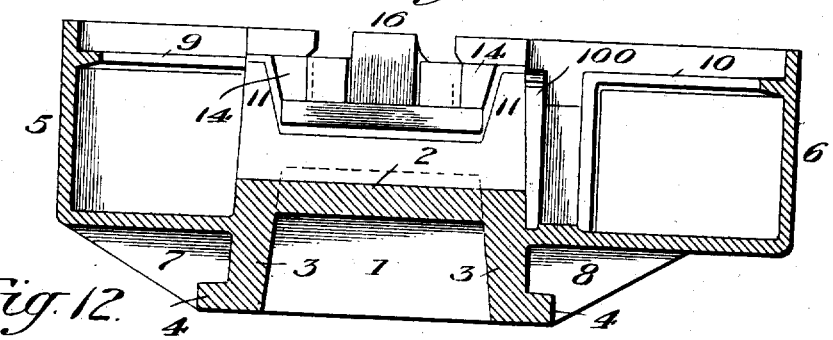
Figure 12:
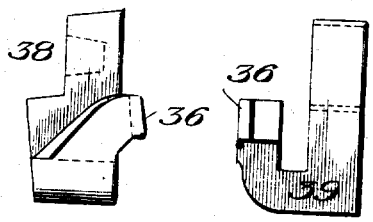
Figure 13:
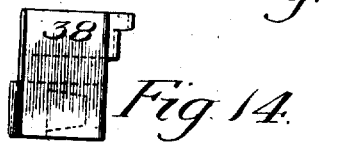
Figure 14:
Figure 15:
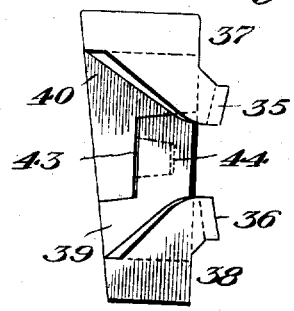
Figure 6:
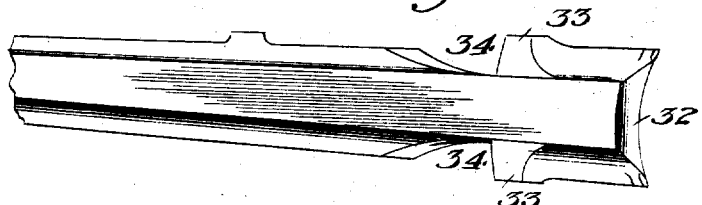
Figure 7:
Figure 8:
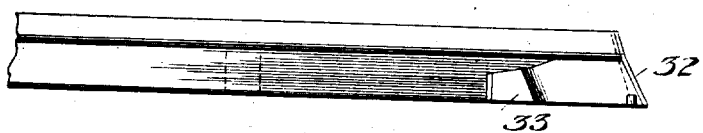
Figure 9:
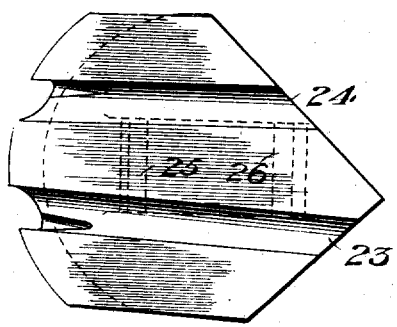
Figure 10:
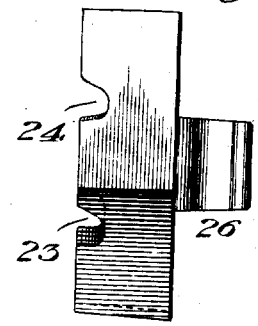
Figure 11:
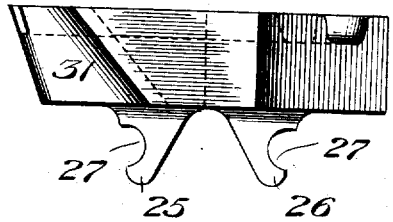

Figure 1 is a plan view of my switch, assembled, but with the extreme end of the switch tongue and body broken away. Fig. 2 is a side view of the parts shown in Fig. 1, looking in the direction of the arrow in the latter. Fig. 3 is a transverse sectional view on the line *x—x* of Fig. 1, looking in the direction of the arrow *x*. Fig. 4 is a similar transverse sectional view on the line *y—y* of Fig. 1, looking in the direction of the arrow *y* in Fig. 1. Fig. 5 is a similar transverse sectional view on the line *z—z*, looking in the direction of the arrow *z* in Fig. 1. Figs. 6, 7 and 8 are top plan, end, and side views, respectively, of the switch tongue, removed. Figs. 9, 10 and 11 are similar views respectively of the heel plate or switch tongue abutment, removed. Figs. 12, 13 and 14 are respectively top plan, side, and end views of one side block, removed. Fig. 15 is a plan view of both side blocks together.

Referring to the drawings, and particularly to Figs. 1, 2, 3 and 4, I have indicated the body of the switch tongue by the numeral 1. This body is usually of cast metal, made H-shaped in cross section with side flanges or webs 3, having foot flanges 4 adapted to rest upon a suitable foundation which is usually a standard concrete monolith, but which may be formed of cross ties or sleepers or in any other well known and suitable manner. This body, 1, has two lateral projecting boxes, 5 and 6, which I prefer to cast integral with the body. Flanges or ribs, 7 and 8, unite the body and the boxes on their under sides, for stiffening purposes.

Extending across between the side flanges 3, the body has a transverse member 2 and upwardly extending flanges 11, between and upon which is supported a manganese steel structure carrying the switch tongue and the bearing surfaces upon which the wheels pass over the switch. This structure is marked with the numeral 12, and has a flat bottom member which I have called a surface plate 13, with connected side flanges or members 14, carrying the heads 15 which constitute the continuations of the rails and carry the wheels over the switch. The switch tongue 16 rests upon the surface plate 13 and moves between the side flanges 14. The entire steel structure 12, lies upon and between the flanges 11 on the body, being supported thereon through the medium of a filling 17 of zinc or other suitable metal poured in after the parts have been accurately adjusted.

The converging rail ends 18 and 19 are secured to the switch body 1 in the process of casting, the effect produced being that of a cast weld, and the rails thereupon becoming rigidly and integrally attached to the switch structure. The end of the body which receives the rails is substantially flush with the upper surfaces thereof, and this portion is cut out as indicated at 20 and 21, in V shape, to receive the heel plate or abutment 22, sufficient clearance being allowed between the walls of the opening and the plate to permit of proper adjustment, after which a zinc filler is poured in.

I do not claim herein the method of securing the heel plate, surface plate or other parts, since they have already been claimed in prior patents among which I may mention: No. 625,458, dated May 23, 1899, No. 694,176, dated February 25, 1902, No. 713,790, dated November 18, 1902 and No. 721,382, dated February 24, 1903. Any suitable form of fastening may, however, be employed.

The plate 22 has grooves 23 and 24 formed in its upper surface, these constituting continuations of the grooves of the rails 18 and 19, and serving to receive the flanges of the wheels as they pass over the plate. On its under side the plate has two projecting lugs or bosses 25 and 26, best shown in Figs. 10 and 11, but indicated in dotted lines in Figs. 1, 2, 5 and 9. These bosses are for the purpose of securing the plate in position, and to this end they extend down through an opening formed in the transverse member of the cast body. Each of the lugs has a recess or opening 27 in its outer face, and when the plate is in position these openings register with complementary openings 28 formed in the body to receive transverse pins or bolts indicated in dotted lines in Fig. 1 and shown in end elevation at 29 in Fig. 2.

The main function of the plate 22 is to take the thrust from and furnish a bearing for the heel of the switch tongue 16. As an ancillary function, the plate constitutes one of the members which holds the tongue down upon the surface plate 13. In order to take the thrust properly the plate has one side ground convex upon an arc whose center is indicated at 30 in Fig. 1. This therefore is the center about which the switch tongue theoretically is rotatable, and so it is the center from which the angular distance through which the tongue moves must be reckoned. In order to hold the tongue down, the bearing plate is undercut around its curved side, as indicated by the dotted lines in Fig. 1 at 31, and as clearly shown in Fig. 11. The heel of the tongue is concaved so as to move smoothly upon the convex surface of the plate, its arc of concavity being also circular and having the same radius as the arc of convexity of the plate. This bearing surface on the tongue is made oblique as best shown in Figs. 6, 7 and 8 being therein indicated by the numeral 32. It underlies the overhang 31 of the plate 22 and at the same time bears against it, the plate thus constituting at once an abutment and a retaining device. A short distance forward of its heel the tongue is provided with laterally extending projections 33, having cam faces reversed as to their obliquity from the surface 32 on the heel. Directly forward from these projections the tongue is cut away as to its side flanges as indicated at 34, for a purpose which will appear in due course. The projections 33 are for the purpose of holding back and holding down the tongue, being engaged by fingers 35 and 36 of a pair of side blocks 37 and 38, which constitute an important feature of the invention. These blocks are shown conjointly assembled together in Fig. 15, and the block 38 is shown by itself in Figs. 12, 13 and 14. The block 38 is provided with a shank 39 which is bent and returned so as to give the entire structure the general shape of the letter L. The block 37 has a similar shank 40, similarly shaped. These two shanks are adapted to engage each other as shown in Fig. 15, so as to produce a unitary although not an integral structure, which may be acted upon as one by the wedge 41 best shown in Fig. 3, but indicated in dotted lines in Figs. 1 and 2. The fingers 35 and 36 of the side blocks overlie the cam projections 33 on the sides of the tongue 16, and the shanks 39 and 40 extend down and engage each other through a transverse opening 42 in the body 1. In thus engaging, and in order to prevent any lateral motion due to the action of the wedge, I provide a dowel or stud 43 on the shank 40 which extends into a recess 44 on the shank 39. When the wedge is removed, the width of the opening through the body is sufficient to permit the two shanks to be inserted from opposite sides and engaged together as shown in Fig. 15, after which the insertion of the wedge 41 prevents their disengagement.

The fingers 35 and 36 extend through side openings in the flanges 11 and 14, these openings being long enough to permit some play so that the fingers can be adjusted upon the cams 33. In order to place the side blocks in position and remove them, as well as to adjust them, I provide the side boxes 5 and 6. The box 5 has really no other function than to receive the side block 37 when it is removed; while the box 6 has the function of receiving the block 38, and also of furnishing an abutment for the adjusting screw 45 which acts upon the wedge 41. This screw is of bronze, and is threaded into a cast iron block 46 which slides up and down in slots formed vertically between the flanges 10 and 100 (best shown in Figs. 1, 3 and 4). The end of the screw bears upon the head of the wedge at 41, and the head of the screw is rather heavy and cylindrical being provided with a double set of openings 48 and 49, the openings of each set being in quadrature so that the wedge can be set up by eight turns. In order to prevent the loss of adjustment after setting up, a pin 50 is provided which is dropped into whichever one of the openings happens to be vertical, so that its lower end will engage between a pair of parallel ribs 51 cast integral with the bottom of the box.

The operation of my invention will now be understood. Assuming the parts to be all assembled as shown in Figs. 6 to 15 inclusive, the body being naked and the plate 22 removed, the procedure in assembling and adjusting is as follows: The surface plate and its flanges and treads 13, 14 and 15, are placed in position, properly adjusted and secured by means of the filler 17, the heel plate 22 is placed in position, with its lugs 25 and 26 dropped through the openings in the body, it is adjusted, the filler inserted, and the transverse pins 29 are driven in. The tongue 16 shown in Figs. 6 and 8 is then dropped into position as shown in Figs. 1 to 4, its heel 32 resting under the overhang 31 of the plate 22. Although they are not shown in the drawings, I preferably provide small projections on both sides of the heel which will engage with the side walls 14 to prevent too much lateral motion of the heel. Of course the entire tongue moves through a certain angular distance with respect to the center 30, but the movement of the heel 32 is very small, as the switch tongue is long. A slight clearance between the projections I speak of and the side walls 14 is entirely sufficient. These projections, as well as the edges of the heel plate where they are cut away to form grooves 23 and 24, and the sides and projections of the tongue, are all beveled or provided with oblique surfaces as shown at 60, 61 and 62. The side openings through the flanges 11 and 14 communicate with the interiors of the boxes 5 and 6, and the effect of all of this is that any dirt or sand or other material which becomes deposited in and about the switch tongue, may wash around the fingers 35 and 36, and down into the boxes, and may partly or wholly fill up the various openings, but it cannot bind the tongue against free movement since the working back and forth tend always to press the material between upwardly inclined surfaces which tend to lift it. The tongue being in place, the side blocks are adjusted through the boxes 5 and 6, the wedge 41 is placed in position, the block 46 carrying the screw 45 is dropped into its place, the screw is set up tightly and the pin 49 is finally dropped into position to retain the adjustment. Obviously, the boxes 5 and 6 may fill up flush with dirt, etc., but except in extraordinary cases, it will rarely be necessary to get into them, and in case of loss of adjustment, the screw head can be dug clear to permit of turning. The cut away portions of the tongue permit its withdrawal by simply loosening the screw 45 so as to allow the blocks 37 and 38 to move back away from the projections 33 on the tongue, and of course the latter can be inserted also without removing the blocks. The tongue may occasionally have to be removed for grinding and I may state here that the only reason for making the heel plate 22 removable is to permit of the grinding of the bearing surface 31.

While I have thus described a specific form of my invention, it will be understood there are many changes possible in the details thereof without departing from the spirit of the invention. I reserve to myself the right to make any and all such changes, holding the same so far as they relate to non-essentials as within the intended scope of the claims appended hereto.

Having thus described my invention what I claim and desire to secure by Letters Patent is:

1. In a railway switch, a body, a pinless tongue having a concave heel, and a bearing or heel plate secured upon the body and provided with a convex surface to receive the heel of the tongue.

2. In a railway switch, a body, convergent rail ends, a pinless tongue in operative relation therewith, said tongue having a bearing surface upon its heel, and a convex abutment or supporting bearing for said heel on the body.

3. In a tongue switch, a body structure, a tongue seated thereon and having a concaved heel end, a convex abutment for said end also having a holding down action thereon, and combined holding down and holding back means engaging the tongue intermediate of its ends; substantially as described.

4. In a tongue switch, a body structure, a pinless tongue seated therein and having a centering bearing at its extreme rear end, said tongue also having a lateral projection forward of said bearing, and rigid means engaging such projection to hold the tongue in operative position in the structure, substantially as described.

5. In a railway switch, a body, convergent rail ends, a tongue in operative relation therewith, said tongue having a bearing surface upon its heel, and an abutment or supporting bearing for said heel on the body, together with means to hold down the tongue comprising an overhang or undercut portion on the abutment, and side blocks engaging the tongue in opposition thereto.

6. In a railway switch, a body, convergent rail ends, a tongue in operative relation therewith, said tongue having a bearing surface upon its heel, and an abutment or supporting bearing for said heel on the body, together with means to hold down the tongue comprising an overhang or undercut portion on the abutment, and a pair of adjustable side blocks acting in opposition thereto.

7. In a railway switch, a body, convergent rail ends, a tongue in operative relation therewith, said tongue having a bearing surface upon its heel, and an abutment or supporting bearing for said heel on the body, together with means to hold down the tongue comprising an overhang or undercut portion on the abutment, a cam face or projection on the tongue, and an adjustable engaging member therefor.

8. In a railway switch, a body, convergent rail ends, a tongue in operative relation therewith, said tongue having a bearing surface upon its heel, and an abutment or supporting bearing for said heel on the body, together with means to hold down the tongue comprising an overhang or undercut portion on the abutment, a pair of cam projections on the sides of the tongue, a pair of side blocks engaging said cam projections, and means for adjusting said side blocks.

9. In a railway switch, a body, convergent rail ends, a tongue in operative relation therewith, said tongue having a bearing surface upon its heel, and an abutment or supporting bearing for said heel on the body, together with means to hold down the tongue, comprising an overhang or undercut portion on the abutment, a pair of cam projections on the sides of the tongue, a pair of side blocks engaging said cam projections, and a wedge for adjusting the side blocks.

10. In a railway switch, a body, convergent rail ends, a tongue in operative relation therewith, said tongue having a bearing surface upon its heel on the body, together with means to hold down the tongue, comprising an overhang or undercut portion on the abutment, a pair of cam projections on the sides of the tongue, a pair of side blocks engaging said cam projections, and a transverse wedge with lateral controlling means for adjusting the said side blocks.

11. In a railway switch, a body provided with side boxes, said body having a transverse opening connecting the cavities of the said boxes, a surface plate and treads on said body, together with converging rail ends and a switch tongue in operative relation thereto, said tongue adapted to have lateral motion upon the surface plate and between the treads, an abutment or bearing surface on the body and a complemental bearing surface on the heel of the tongue and means for holding said tongue in proper relation with the abutment comprising an overhang and undercut portion on the abutment, a pair of cam projections on the sides of the tongue with their cam faces sloping away from the abutment, a pair of side blocks having shanks adapted to drop below the surface plate and engage each other within the transverse opening in the body and upwardly and inwardly projecting fingers to engage said cam surfaces on the tongue, means for securing the shanks on the side blocks together in the transverse opening, and adjusting means working laterally into one or both of the side boxes, and adapted to produce longitudinal movement of both said blocks jointly toward and away from the abutment, all substantially as described.

12. In a railway switch, a body, a pinless tongue having a concave heel, and a bearing or heel plate removably secured upon the body and provided with a convex surface to receive the heel of the tongue.

13. In a railway switch, a body, convergent rail ends, a tongue in operative relation therewith, said tongue having a bearing surface upon its heel, an abutment or supporting bearing for the heel on said body, and means to hold the tongue down upon the body, said means comprising a pair of retaining members acting in opposition to the abutment.

14. In a railway switch, a body, convergent rail ends, a tongue in operative relation therewith, said tongue having a bearing surface upon its heel, an abutment or supporting bearing for said heel on the body, and means to hold the tongue down upon the body, said means comprising a pair of adjustable side blocks acting thereon.

15. In a railway switch, the combination with a body, of convergent rail ends, a pinless tongue in operative relation therewith, said tongue having a bearing surface upon its heel, and a plurality of wedging devices engaging parts of the same to hold the tongue in operative position upon the body.

16. In a railway switch, a body, a pinless tongue having a concave heel, and a convex bearing surface on the body to receive said heel, with means to hold the tongue down upon the body and against the bearing surface.

17. In a railway switch, the combination with a body, of convergent rail ends, a tongue in operative relation therewith and having a bearing surface resting on the body, means for securing the tongue in position, means for compensating for wear on said securing means, and wedging means on the tongue acting in conjunction with the body to prevent the accumulation of foreign matter.

18. In a railway switch, the combination with a body, of convergent rail ends, a tongue in operative relation therewith having a bearing surface upon its heel, devices engaging the tongue to hold it in operative position on the body and wedges formed on the heel end of the tongue and acting in conjunction with the body to prevent accumulation of dirt in the bearing.

In testimony whereof I affix my signature in presence of two witnesses.

HENRY B. NICHOLS.

Witnesses:
JAS. S. CLIFFORD,
WM. D. GHEDLEY.